US006392659B1

(12) United States Patent
Ohki et al.

(10) Patent No.: US 6,392,659 B1
(45) Date of Patent: May 21, 2002

(54) IMAGE CONNECTING METHOD, IMAGE CONNECTING APPARATUS, AND STORAGE MEDIUM STORING AN IMAGE CONNECTING PROGRAM

(75) Inventors: Mitsuharu Ohki, Tokyo; Takashi Totsuka, Chiba; Kyoko Nakamura, Tokyo, all of (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/249,566

(22) Filed: Feb. 9, 1999

(30) Foreign Application Priority Data

Feb. 16, 1998 (JP) .......................................... 10-033407
Aug. 6, 1998 (JP) .......................................... 10-223393

(51) Int. Cl.⁷ ................................................ G09G 5/00
(52) U.S. Cl. ........................................ 345/630; 345/634
(58) Field of Search ......................... 345/333, 435, 345/629, 744, 640, 634, 630; 348/383

(56) References Cited

U.S. PATENT DOCUMENTS

| | | | | | |
|---|---|---|---|---|---|
| 4,641,255 A | * | 2/1987 | Hohmann | ................... | 345/435 |
| 4,827,253 A | * | 5/1989 | Maltz | ....................... | 345/640 |
| 5,060,171 A | * | 10/1991 | Steir et al. | .................. | 345/435 |
| 5,196,922 A | * | 3/1993 | Yeomans | .................... | 348/578 |
| 5,321,798 A | * | 6/1994 | Burman et al. | ............ | 345/630 |
| 5,459,819 A | * | 10/1995 | Watkins et al. | ............ | 358/1.18 |
| 5,479,603 A | * | 12/1995 | Stone et al. | ................ | 345/326 |
| 5,488,674 A | * | 1/1996 | Burt et al. | .................. | 382/284 |
| 5,687,306 A | * | 11/1997 | Blank | ........................... | 345/435 |
| 5,815,645 A | * | 9/1998 | Fredlund et al. | .......... | 358/1.18 |
| 5,870,103 A | * | 2/1999 | Luo | ............................. | 345/630 |
| 5,937,081 A | * | 8/1999 | O'Brill et al. | ............. | 382/111 |
| 5,963,214 A | * | 10/1999 | Cok et al. | ................... | 345/435 |
| 5,986,671 A | * | 11/1999 | Fredlund et al. | .......... | 345/435 |
| 6,026,215 A | * | 2/2000 | Fantone et al. | ............ | 395/102 |
| 6,043,824 A | * | 3/2000 | Bier | ............................. | 345/630 |
| 6,049,339 A | * | 4/2000 | Schiller et al. | ............. | 345/630 |
| 6,069,713 A | * | 5/2000 | Kusama | ...................... | 358/452 |
| 6,075,905 A | * | 6/2000 | Herman et al. | ............ | 382/284 |
| 6,137,919 A | * | 10/2000 | Gonsalves et al. | .......... | 382/284 |
| 6,151,421 A | * | 11/2000 | Yamada | ..................... | 382/284 |

OTHER PUBLICATIONS

"Compositing I: Theory", J. F. Blinn, IEEE Computer Graphics and Applications, 14(5), p. 83–87, Sep. 1994.*
"Video Mosaics for Virtual Environments", R. Szeeliski, IEEE Computer Graphics and Applications, p. 22–30, Mar. 1996.*

\* cited by examiner

*Primary Examiner*—Jeffery Brier
*Assistant Examiner*—Ryan Yang
(74) *Attorney, Agent, or Firm*—Bell, Boyd & Lloyd LLC

(57) ABSTRACT

The invention provides an image connecting method, an image connecting apparatus, and a storage medium on which an image connecting program is stored, for connecting a first image and a second image such that particular connecting areas are determined for the first image and the second image and the first and second images in the connecting areas are combined together thereby connecting the first and second images into a single image including no unnatural parts. The first image and the second image are decomposed into frequency components. The connecting area is determined for each frequency component such that the connecting area becomes narrower with the increase in the frequency of the frequency component, and the first and second images are combined in the connecting area for each frequency component. After that, particular partial images in the first and second images are designated. The designated partial images are extracted from the first or second image, and extracted partial images are overwritten on the connecting part.

21 Claims, 12 Drawing Sheets

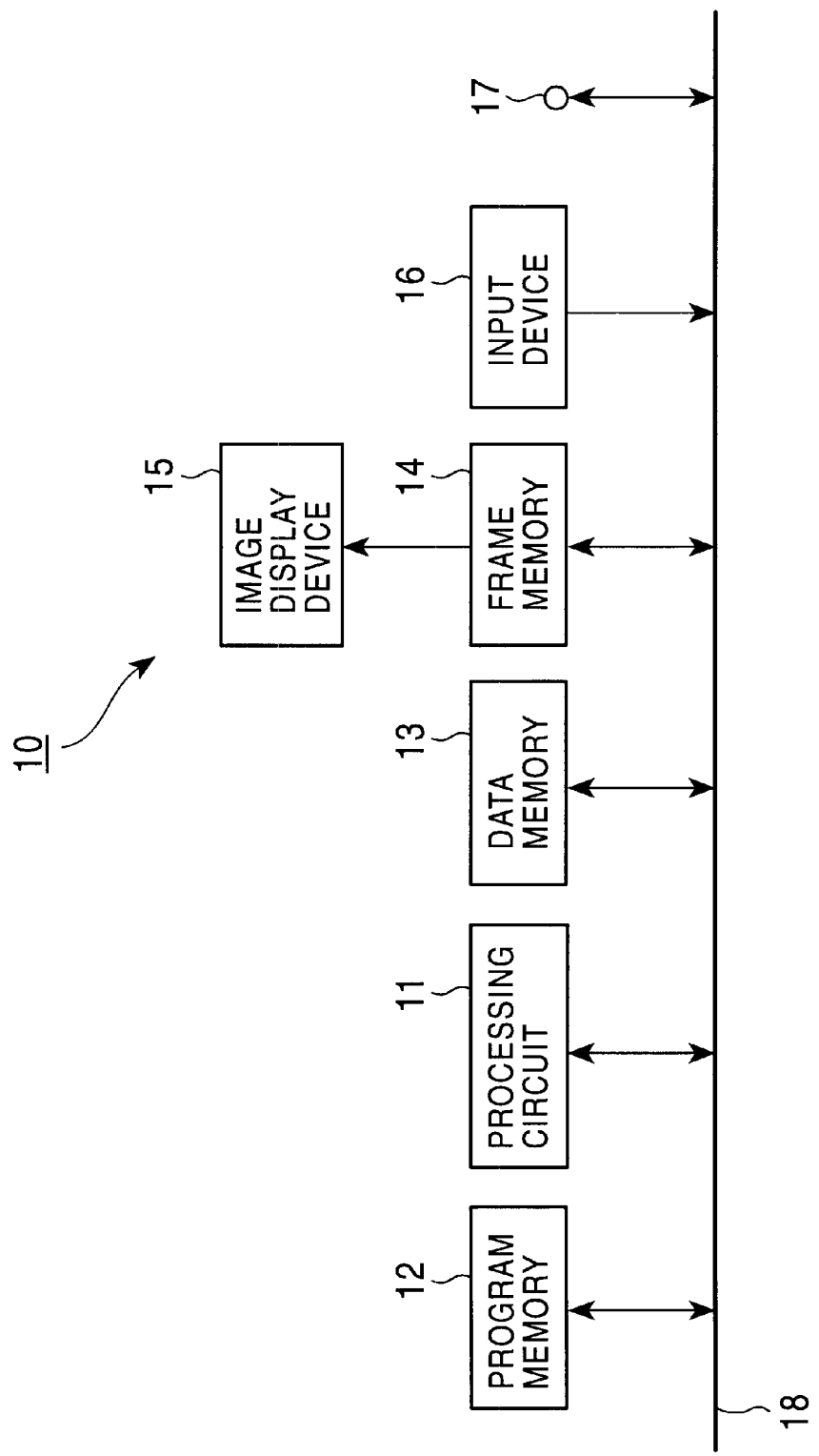

AREA WHERE α=0
AREA WHERE α=1
AREA WHERE α=0.25
AREA WHERE α=0.75
X

FIRST SIGNAL
THIRD SIGNAL
SECOND SIGNAL
CONNECTING RANGE
t

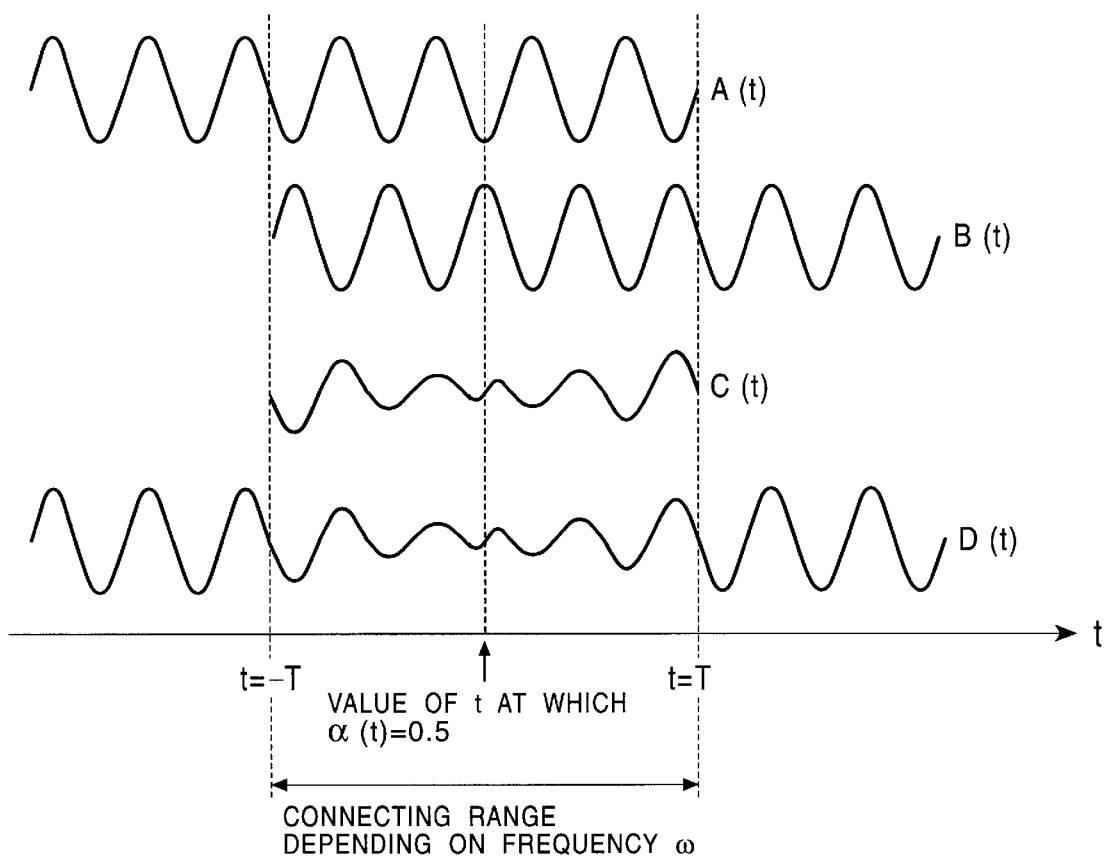

IMAGE CONNECTING METHOD, IMAGE CONNECTING APPARATUS, AND STORAGE MEDIUM STORING AN IMAGE CONNECTING PROGRAM

BACKGROUND OF THE INVENTION

1. Field of the Invention

The present invention relates to an image connecting method, an image connecting apparatus, and a storage medium on which an image connecting program is stored, for connecting first and second images to each other in such a manner that a particular connecting area is determined for the first and second images and the first and second images are combined together in the connecting area.

2. Description of the Related Art

When first and second signals are given, for example, as shown in FIG. 13, one known technique of creating a third signal which smoothly connects the former two signals is to calculate the weighted sum. A specific method of connecting signals based on this weighting addition is disclosed for example in a paper entitled "A Multiresolusion Spline With Application to Image Mosaics" (Peter J. Burt, ACM Transaction on Graphics, Vol. 2, No. 4, October, 1983, pp. 217–236).

In the signal connecting technique disclosed in the paper cited above, first and second signals are connected in a particular area which is variable depending on frequency components. More specifically, the first and second signals are connected in a narrow connection area for high-frequency components, while the first and second signals are connected in a wide connection area for low-frequency components. Furthermore, in this technique disclosed in the above paper, weighted sums are calculated for respective frequency components to connect the first and second signals.

The method of connecting first and second signal at a particular frequency (for example ω)) according to this technique is described below with reference to FIG. 14.

In FIG. 14, A(t) denotes a function representing a frequency component of the first signal at frequency ω. B(t) denotes a function representing a frequency component of the second signal at frequency ω. The components of the first and second signals at frequency ω are connected to each other in the connecting range of t=−T to T. As described above, the connecting range varies depending on the frequency ω.

A third signal, via which the frequency component A(t) of the first signal at frequency ω and the frequency component B(t) of the second signal at frequency ω are connected, is determined over the connecting range such that the third signal has a frequency component C(t) given by the following equation:

$$C(t) = \{1 - \alpha(t)\} \times A(t) + \alpha(t) \times B(t)$$

where α(t) is a monotonically increasing function which has a value 0 at t=−T and 1 at t=T. Herein, C(t) is defined within the connecting range from t=−T to T.

The overall signal D(t) resulting from the connection of the components at frequency ω becomes as follows:

D(t)=A (t) for t≦−T,
D(t)=C (t) for −T<t<T, and
D(t)=B (t) for T<t.

The method of connecting the first and second signals has been described above for the particular component at frequency ω. In the technique disclosed in the above-cited paper, a similar calculation is performed for all frequency components and resultant signals are all added together to obtain a final result representing a connected signal.

In this signal connecting technique, as can be seen from the above discussion, DC components (components at an extremely low frequency) are connected to each other via a gradually varying signal in a wide connecting range thereby preventing a conspicuous abrupt change which would appear if the connection were performed in a narrow connecting range. On the other hand, high-frequency components are connected to each other in a narrow connecting range via a signal efficiently generated from the original first and second signals A(t) and B(t).

Although the signal connecting method has been described above with reference to an one-dimensional signal, this signal connecting method can also be applied to a two-dimensional signal such as an image signal.

The above-described signal connecting method is discussed further for the case where the signal connecting method described above is used to connect images including a large number of parts having extremely different aspect ratios, as is the case in an image of hairs.

For example, let us assume that a first image 101 including a plurality of hairs as shown in FIG. 15A and a second image 102 including, as shown in FIG. 15B, a plurality of hairs different from those of the first image 101 are connected to each other such that these two images are overlapped in a particular connecting area and a third image 103 is generated as shown in FIG. 15C.

In this connecting process, the first image 101 and the second image 102 are decomposed into frequency components and connecting ranges are determined for the respective frequency components. For high-frequency components, a narrow connecting range is set near the center within the maximum connecting range and the weighted sum of the frequency components is calculated over this narrow range so that the first and second images 101 and 102 are connected to each other via the signal given by the resultant weighted sum. For low-frequency components, a connecting range occupying a wider range within the maximum connecting range is set and the weighted sum of the frequency components is calculated over this wide connecting range so that the first and second images 101 and 102 are connected to each other via the signal given by the resultant weighted sum.

The resultant frequency components are all added together so as to create a third image 103 which is an overall image in which the first image 101 and the second image 102 are combined. Although only two ranges, that is, a "narrow connecting range" for a high-frequency component and a "wide connecting range" for a low-frequency component are shown in FIG. 15C, various ranges for middle frequency components are set in addition to the above two ranges, in a practical connecting process.

Now, let us assume that the plurality of hairs in the first image 101 include one conspicuous hair 104. Herein, the "conspicuous hair" refers to such a hair having a conspicuous edge caused by peculiar illumination or reflection of light. Such a conspicuous hair 104 includes a lot of high-frequency components.

For the conspicuous hair 104, the connection between the first image 101 and the second image 102 is performed in a narrow range because it includes a lot of high-frequency components. As a result, in the resultant combined third image 103, the conspicuous hair 104 disappears near the center of the connecting range as shown in FIG. 15C.

Herein, let us assume that the plurality of hairs in the second image 102 also include one conspicuous hair 105. This conspicuous hair 105 also include a lot of high-frequency components.

Also for the conspicuous hair 105 including such a lot of high-frequency components, the first image 101 and the second image 102 are connected to each other in a narrow range, and thus the conspicuous hair 105 in the resultant combined third image 103 disappears near the connecting range as shown in FIG. 15C.

Thus, in the resultant third image 103 obtained by connecting the two images of hairs overlapped in the particular range, conspicuous hairs such as a hair 104 extending from the left disappear near the center and conspicuous hairs such as a hair 105 extending from the right also disappear near the center. As a result, the third image 103 becomes unnatural in that there is no hair extending across the central area.

As described above, when a conspicuous object such as a hair is included in both images to be connected, if the two images are connected to each other according to the above signal connecting technique, the resultant image becomes unnatural in that the conspicuous object disappears near the center of the connecting area.

Now, let us assume that the first image 101 is a blurred image of hairs and that the second image 102 is a high-density image of hairs. If these two images are connected into a third image 103, the third image 103 becomes unnatural in that the left-side part is a blurred image and the right-side part is a high-resolution image.

As described above, if two signals having different resolutions are connected to each other using the above-described conventional signal connecting technique, the resultant image becomes unnatural.

Another problem is that there is no available storage medium storing a processing program used by a computer to perform a signal connecting process.

In view of the above, it is an object of the present invention to provide an image connecting method, an image connecting apparatus, and a storage medium on which an image connecting program is stored, for connecting first and second images to each other in such a manner that a particular connecting area is determined for the first and second images and the first and second images are combined together in the connecting area into a natural image including no unnatural parts.

SUMMARY OF THE INVENTION

According to an aspect of the present invention, there is provided a method of connecting first and second images to each other, the method comprising: a connection step in which particular connecting areas are determined for the first image and the second image and then the first and second images in the connecting areas are combined together thereby connecting the first and second images to each other; a selection step for selecting a partial image of the first image; and an overwrite step for extracting the selected partial image from the first image and overwriting the extracted partial image on a connecting part produced in the connection step.

According to another aspect of the present invention, there is provided an image connecting apparatus for connecting a first image and a second image to each other, the apparatus comprising: connection means by which particular connecting areas are determined for the first image and the second image and then the first and second images in the connecting areas are combined together thereby connecting the first and second images to each other; selection means for selecting a partial image of the first image; and overwrite means for extracting the selected partial image from the first image and overwriting the extracted partial image on the connecting part produced by the connection means.

According to still another aspect of the present invention, there is provided an information providing medium for providing an image connecting program for connecting a first image and a second image to each other, the image connecting program comprising: a connection process in which particular connecting areas are determined for the first image and said second image and then said first and second images in the connecting areas are combined together thereby connecting the first and second images to each other; a selection process for selecting a partial image of the first image; and an overwrite process for extracting the selected partial image from the first image and overwriting the extracted partial image on the connecting part produced in the connection process.

BRIEF DESCRIPTION OF THE DRAWINGS

FIG. 4 is a block diagram of an image connecting apparatus for performing an image connecting process according to a processing program which is based on the image connecting method of the invention and which is stored in a memory;

FIG. 14 illustrates a particular frequency component of the first signal and that of the second signal to be connected according to the conventional signal connecting method and also illustrates a particular frequency component of the third signal via which the first and second signals are connected.

DESCRIPTION OF THE PREFERRED EMBODIMENTS

The image connecting method according to the present invention is described in further detail below with reference to preferred embodiments in conjunction with the accompanying drawings.

In a preferred embodiment, by way of example, two images including parts with extremely different aspect ratios, such as images of hairs, are connected to each other according to the image connecting method of the invention. More specifically, a particular connecting area is defined for a first image 1 including a plurality of hairs shown in FIG. 1A and also for a second image 2, shown in FIG. 1B, including a plurality of hairs different from those of the first image 1, and the first image 1 and the second image 2 are connected to each other by combining them in the connecting area.

In this image connecting method, the first image 1 and the second image 2 are connected by performing the following two processes: a first process or a connecting image generation process; and a second process or an overwrite process, which will be described in detail later. Furthermore, in this image connecting method, a filtering process is performed as required before the connecting image generation process.

The first process, that is, the connecting image generation process is described first.

In this connecting image generation process, the first image 1 and the second image 2 are connected to each other using the above-described technique disclosed in "A Multiresolusion Spline With Application to Image Mosaics" (Peter J. Burt, ACM Transaction on Graphics, Vol. 2, No. 4, October 1983, pp. 217–236).

That is, in this connecting image generation process, the first image 1 and the second image 2 are decomposed into frequency components, and different connecting areas are defined for respective frequencies. For high-frequency components, a narrow connecting range is set near the center within the maximum connecting range and the weighted sum of the frequency components is calculated over this narrow range so that the first and second images are connected to each other via the signal given by the resultant weighted sum. For low-frequency components, a connecting range occupying a wider range within the maximum connecting range is set and the weighted sum of the frequency components is calculated over this wide connecting range so that the first and second images are connected to each other via the signal given by the resultant weighted sum.

The resultant frequency components are all added together so as to create a third image 3 which is an overall image in which the first image 1 and the second image 2 are combined.

Figure 1A:
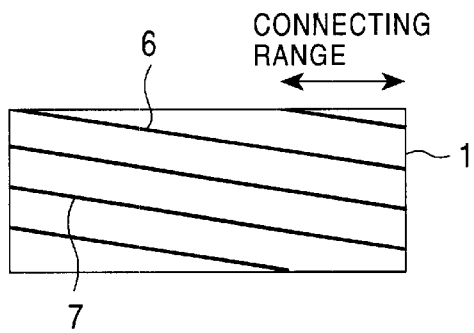
FIGS. 1A, 1B, 1C and 1D illustrate first and second images to be connected according to an image connecting method of an embodiment of the invention, and also illustrates third and fourth images produced by the image connecting method.
Figure 1B:
Figure 1C:

In the third image generated by the above-described connecting image generation process, conspicuous hairs including large amounts of high-frequency components disappear near the center of the connecting area as shown in FIG. 1C.

In the connecting image generation process, two-dimensional signals may be decomposed into one-dimensional signals, and the resultant one-dimensional signals may be processed according to the signal connecting method described below so as to create a third image 3 in which the first image 1 and the second image 2 are combined.

Figure 2:
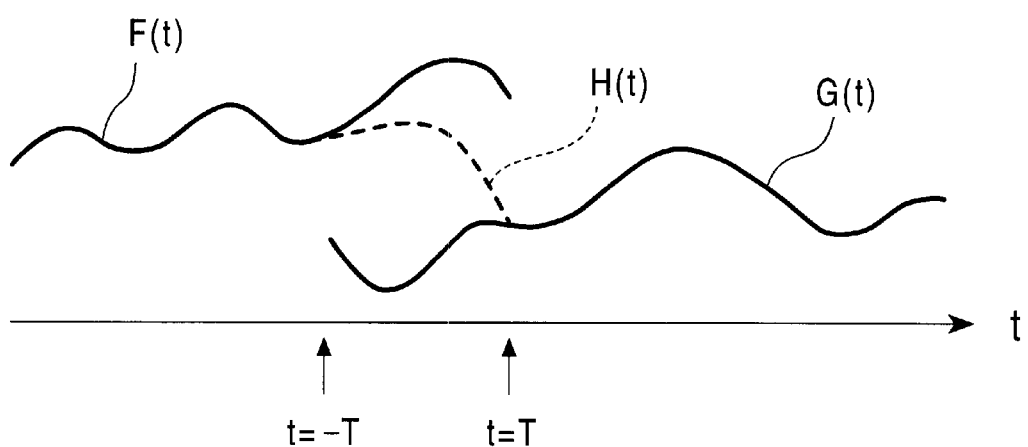
FIG. 2 illustrates first and second signals to be connected according to the image connecting method.

In FIG. 2, F(t) and G(t) denote first and second signals, respectively, which are to be connected into a third image 3 according to the signal connecting method. The first signal F(t) is defined in the range $t \leq T$ and the second signal G(t) is defined in the range $-T \leq t$.

Therefore, the first signal F(t) and the second signal G(t) have an overlapping range $-T<t<T$. Herein, the overlapping range corresponds to the above-described connecting range for connecting the first image 1 and the second image 2.

A third signal H(t) defined in the range $-T<t<T$ is created according to the signal connecting method. Thus, the overall combined signal produced according to this signal connecting method is given by:

F(t) for $t \leq -T$,

H(t) for $-T<t<T$, and

G(t) for $T \leq t$.

Herein, the third signal H(t) is created as follows.

First, a Fourier transform is performed on the first signal F(t) so as to determine frequency components thereof. That is, the frequency component of the first signal F(t) at frequency ω is given by $A_\omega(t)=P_\omega \times \cos(\omega t+\theta_\omega)$ wherein $P_\omega$ is the amplitude of the component at frequency ω of the first signal F(t) and $\theta_\omega$ is the phase of that component. If $A_\omega(t)$ is added together for all ω, then the first signal F(t) is obtained.

Similarly, frequency components of the second signal G(t) are determined by means of Fourier transform. That is, the frequency component of the second signal G(t) at frequency ω is given by $B_\omega(t)=Q_\omega \times \cos(\omega t+\phi_\omega)$ wherein $Q_\omega$ is the amplitude of the component at frequency o of the second signal G(t) and $\phi_\omega$ is the phase of that component. If $B_\omega(t)$ is added together for all ω, then the second signal G(t) is obtained.

After that, a connecting range is determined for each frequency ω. The connecting range for the DC component and the component at the lowest frequency ($\omega_1$) is determined as from $-T$ to $T$. For the other components (at frequency ω), the connecting range is given by the range from $-T \times \omega_1/\omega$ to $T \times \omega_1/\omega$. As can be seen, in this signal connecting method, the connecting range varies depending on the frequency component.

Subsequently, a function $C_\omega$ corresponding to each frequency component (ω) is determined from the frequency components of the first and second signals obtained by means of the Fourier transform.

For ω=0 (that is, for the DC component), the function $C_\omega(t)$ is given by:

[DC component of $F(t)$]×{1−β(t/T)}+[DC component of $G(t)$]×β(t/T)

where β(y) is a monotonically increasing function having a value of 0 at y=−1 and 1 at y=1. A specific example of β(y) is β(y)=0.5×(y+1) or β(y)=[($y^{1/3}$)/2]+0.5.

The function $C_\omega$ for the other frequency components (ω) other than the DC component is given as follows.

First, a function U(ω) defined as $U(\omega)=T \times \omega_1/\omega$ is introduced. Herein, another proper function which decreases with ω may also be employed as U(ω).

Then, the function $C_\omega(t)$ is given by:

$C_\omega(t)=A_\omega(t)$ for $-T<t\leq-U(\omega)$, $C_\omega(t)=B_\omega(t)$ for $U(\omega)\leq t<T$, and $C_\omega(t)=[P_\omega\times\{1-\beta(t/U(\omega))\}+Q_\omega\beta(t/U(\omega))]\times\cos(\Omega\times t+\delta)$ for $-U(\omega)<t<U(\omega)$ where $\Omega$ and $\delta$ are parameters which vary depending on $\omega$ and which satisfy the following two equations:

$\cos\{\Omega\times(-U(\omega))+\delta\}=\cos\{\omega\times(-U(\omega))+\theta_\omega\}$ and $\cos(\Omega\times U(\omega)+\delta)=\cos(\omega\times U(\omega))+\phi_\omega)$ There are a plurality of combinations of $\Omega$ and $\delta$ which satisfy the above two equations, because trigonometric functions are periodic functions with a period of $2\pi$. Herein, a value of $\Omega$ closest to $\omega$ is employed.

Figure 3A:
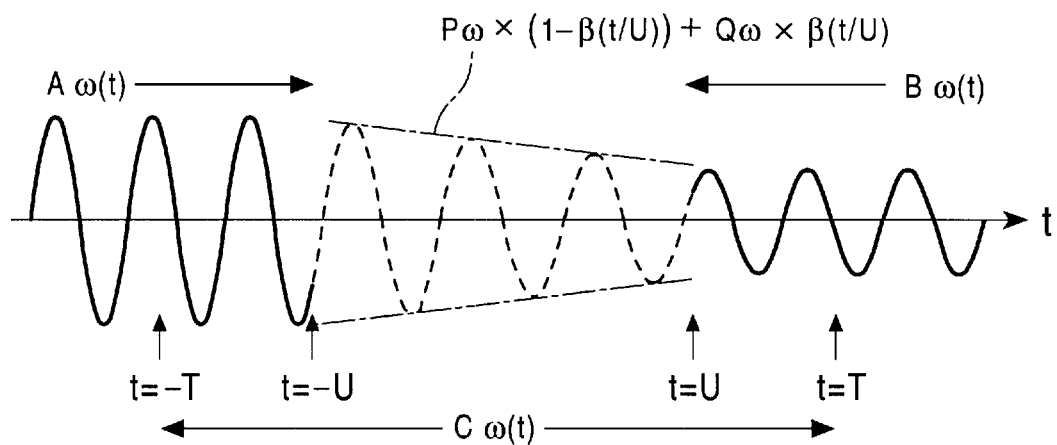
FIGS. 3A and 3B illustrate a particular frequency component of the first signal and that of the second signal and also illustrates a particular frequency component of a third signal via which the first and second signals are connected.
Figure 3B:
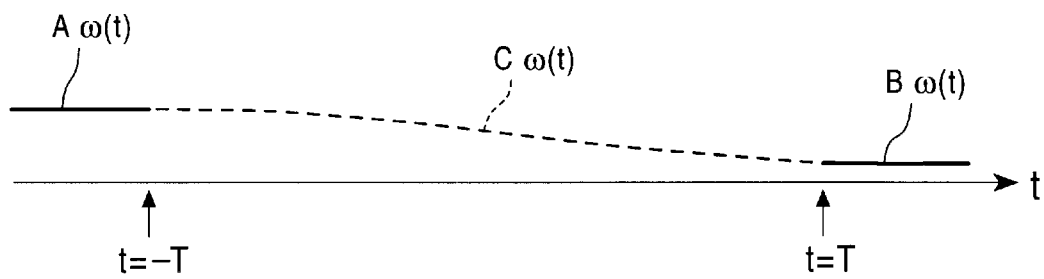

The functions $A_\omega(t)$, $B_\omega(t)$, and $C_\omega(t)$ are shown in FIGS. 3A, 3B an 3C, wherein the functions shown in FIG. 3A are for $\omega\approx0$ (that is, AC components) and the functions shown in FIG. 3B are for $\omega=0$ (that is, DC component).

After determining the function $C_\omega(t)$ for the respective frequency components, the sum of $C_\omega(t)$ for all $\omega$ is determined. The result gives the third signal $H(t)$.

According to the procedure described above, the third signal $H(t)$ can be generated.

The function $C_\omega(t)$ is smoothly connected to $A_\omega(t)$ at $t=-T$. The function $C_\omega(t)$ is also connected smoothly to $B_\omega(t)$ at $t=T$.

At any point in the connecting rage (from $-U(\omega)$ to $U(\omega)$, the function $C_\omega(t)$ has a frequency $\Omega$ (with a value close to $\omega$) and has an amplitude with a value between $P_\omega$ and $Q_\omega$.

Therefore, the function $C_\omega(t)$ can be produced such that the amplitude does not become 0 at any point.

Furthermore, the connecting range (from $-U(\omega)$ to $U(\omega)$) becomes narrow with the increasing frequency.

As described above, in the connecting image generation process, that is the first process of the image connecting method according to the present embodiment, the third image 3, in which the first image 1 and the second image 2 are combined, may be generated using the signal connecting method described above.

Now, the second process, that is, the overwrite process, is described below.

At a first step of this overwrite process, one or more conspicuous hairs in the original first image 1 shown in FIG. 1A are designated. Herein, these are referred to as first partial data 6 and 7. Similarly, one or more conspicuous hairs in the original second image 2 shown in FIG. 1B are designated. These are referred to as second partial data 8 and 9.

More specifically, if the user finds out conspicuous hairs in the first image 1 or the second image 2 displayed, the user designates those hairs with a mouse or the like.

Figure 1D:
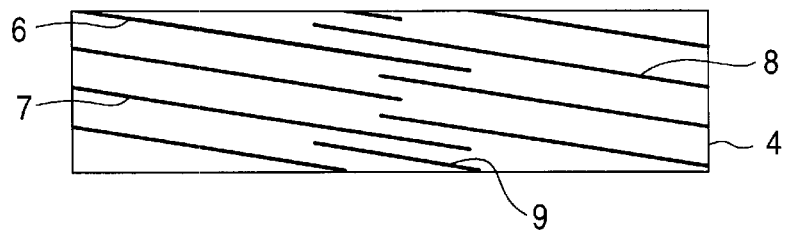

The first partial data 6 and 7 and the second partial data 8 and 9 are extracted from the first image 1 and the second image 2, respectively, by means of image processing. The extracted data are then overwritten on the third image 3, shown in FIG. 1C, which has been generated in the first process or the connecting image generation process. Thus, via the overwrite process, the third image 3 becomes a fourth image 4 which includes, as shown in FIG. 1D, the conspicuous hairs written on the basis of the first data 6 and 7 and the second partial data 8 and 9 at locations where they disappear in the third image 3.

According to the image connecting method of the present embodiment, as described above, the connecting image generation process and the overwrite process are performed so as to obtain a naturally connected image without generating an unnatural part such as a conspicuous object disappearing near the center of the connecting area even when conspicuous objects such as conspicuous hairs are included in the original first image 1 and the second image 2 which are connected to each other.

Now, the filtering process is described above.

As described earlier, the filtering process is performed as required before the connecting image generation process.

Herein, let us assume that the second image 2 has a higher resolution than the first image 1. If a fourth image 4 is generated from such first and second images 1 and 2 by means of the connecting image generation process and the overwrite process described above, then the resultant fourth image includes a low-resolution part on the left side (corresponding to the first image 1) and a high-resolution part on the right side (corresponding to the second image 2). As a result, the fourth image 4 becomes unnatural. To avoid the above problem, the filtering process is performed as required.

In the filtering process, the first image 1 is subjected to the Fourier transform so as to determine the frequency band of the first image 1. Then the second image 2 is passed through a lowpass filter which passes only the frequency components within the frequency band determined above. Herein, the resultant signal obtained by passing the second image through the filter is referred to as a fifth image. This fifth image has a frequency band equal to that of the first image 1. That is, the fifth image is equal in resolution to the first image.

After that, a fourth image 4 is generated from the first image 1 and the fifth image 5 by means of the connecting image generation process and the overwrite process described above. Thus, according to the image connecting method of the present embodiment, it is possible to generate an image having the same resolution for the left and right sides of the combined image and including no unnatural parts.

Although in the specific example described above, the filtering process is performed before the connecting image generation process, the filtering process may also be performed on the entire fourth image 4 after the overwrite process.

An image connecting apparatus, which performs processes according to a processing program based on the above-described image connecting method, is now described below.

FIG. 4 is a block diagram illustrating the construction of an image connecting apparatus for performing the above-described processes.

The image connecting apparatus 10 includes a processing circuit 11, a program memory 12 for storing a processing program used by the processing circuit 11, a data memory 13 for storing data used in the process, a frame memory 14 for storing image signals to be connected and also a resultant image signal obtained by the connecting process, an image display device 15 for displaying the image signal stored in the frame memory 14, an input device 16 including a mouse and a keyboard, an input/output terminal 17 via which the image signals to be connected are input and the resultant combined signal is output, and a bus 18 for connecting various circuits so that the program and the data are transmitted among the circuits.

Figure 5:
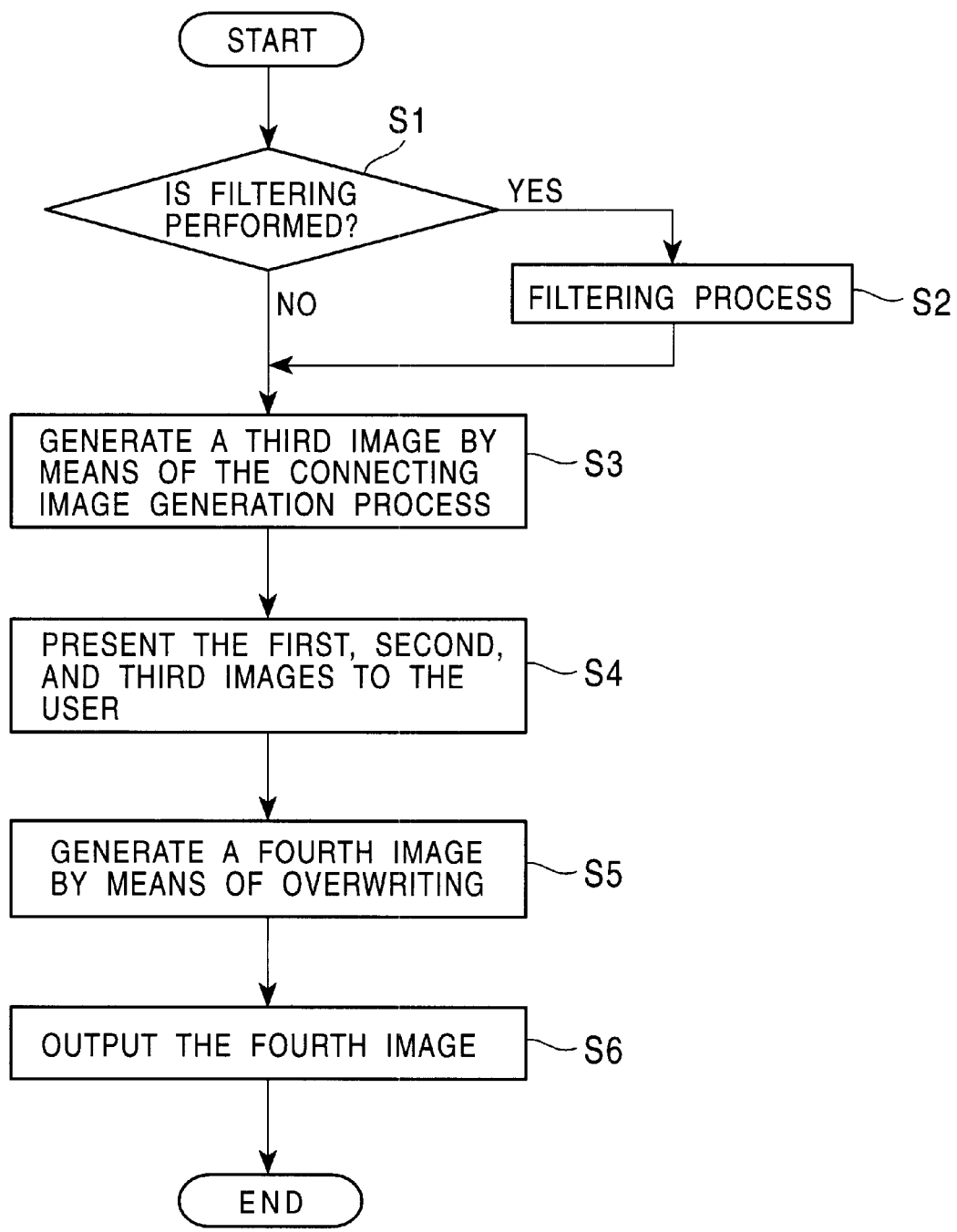
FIG. 5 is a flowchart illustrating the process performed by the image connecting apparatus.

The image connecting apparatus 10 connects the first image 2 and the second image 2 by performing the process shown in the flowchart of FIG. 5.

First, two images (the first image 1 and the second image 2) to be connected are input to the image connecting apparatus via the input/output terminal 17. The input image signals are stored in the data memory 13.

When the two image signals are input to the data memory 13, a user designates, via the input device 16, in step S1, whether the filtering process should be performed or not. When the filtering process is required, the process goes to step S2. Otherwise, the process goes to step S3.

In the following step S2, the first image signal 1 and the second image signal 2 stored in the data memory 13 are supplied to the processing circuit 11. The processing circuit 11 performs a Fourier transform on the first image signal 1 and determines the maximum frequency of the first image signal 1. After that, the second image signal 2 is passed through the lowpass filter which can pass only the frequency components lower than the maximum frequency determined above. The resultant signal is stored, as a new second image signal 2, into the data memory 13. Then the process goes to step S3.

In step S3, the first image signal 1 and the second image signal 2 stored in the data memory 13 are supplied to the processing circuit 11. The processing circuit 11 generates a third image signal 3 by performing the first process, that is, the connecting image generation process.

In the following step S4, the input first image 1 and second image 2 and also the third image 3 generated in step S3 are displayed on the image display device 15 so that the operator can see them. That is, the first image signal 1, the second image signal 2, and the third image signal 3 stored in the data memory are copied into the frame memory 14 and displayed on the image display device 15.

In the next step S5, the operator designates a part to be overwritten while monitoring the image displayed. The information about the position of the designated part is supplied to the processing circuit 11 via the input device 16. At the same time, the first image signal 1, the second image signal 2, and the third image signal 3 stored in the data memory 13 are also supplied to the processing circuit 11. The processing circuit 11 extracts the partial data (first partial data 6, 7 or second partial data 8, 9) corresponding to the position of the designated part from first image signal 1 or the second image signal 2. The processing circuit 11 then overwrites the extracted partial data on the third image signal 3 thereby generating a fourth image signal 4. The fourth image signal 4 obtained via the overwrite process is stored into the data memory 13.

Finally, in step S6, the fourth image signal 4 stored in the data memory 13 is output via the input/output terminal 17. Thus the entire process is complete.

By performing the above-described steps S1 to S6, the image connecting apparatus 10 can generate a combined image in a natural fashion with no parts disappearing near the center of the connecting area even when the original first image 1 and the second image 2 connected to each other include an object having a conspicuous edge such as a conspicuous hair.

A processing program corresponding to steps S1 to S6 described above may be stored on a storage medium and a computer may perform the signal connecting process according to the program stored on the storage medium.

Examples of applications of the image connecting method according to the above-described embodiment are described below.

Herein, let us assume that a photographed image 40 of a second person is combined into an image 30 of a first person photographed on a street. The process of combining such images is described below with reference to FIGS. 6 to 10.

Figure 6:
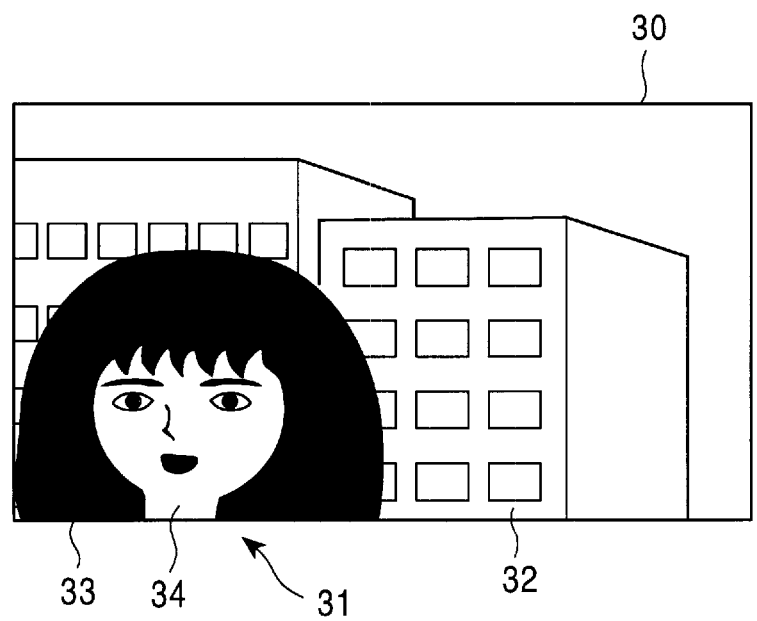
FIG. 6 illustrates an image of a first person photographed on a street, wherein the image of the first person is to be connected according to the image connecting method of the invention.
Figure 7:
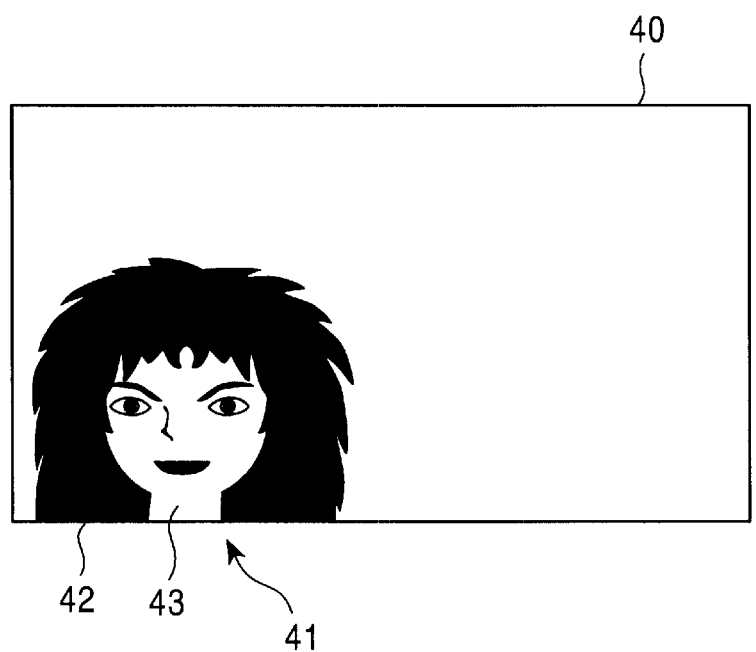
FIG. 7 illustrates a photographed image of a second person, to be connected according to the image connecting method of the invention.

As shown in FIG. 6, the photographed image 30 includes a first image of a person 31 and a background 32 including a building. The first image of the person 31 includes a hair image 33 and a face image 34. On the other hand, the photographed image 40 includes, as shown in FIG. 7, an image of a person 41 including a hair image 42 and a face image 43.

Figure 8:
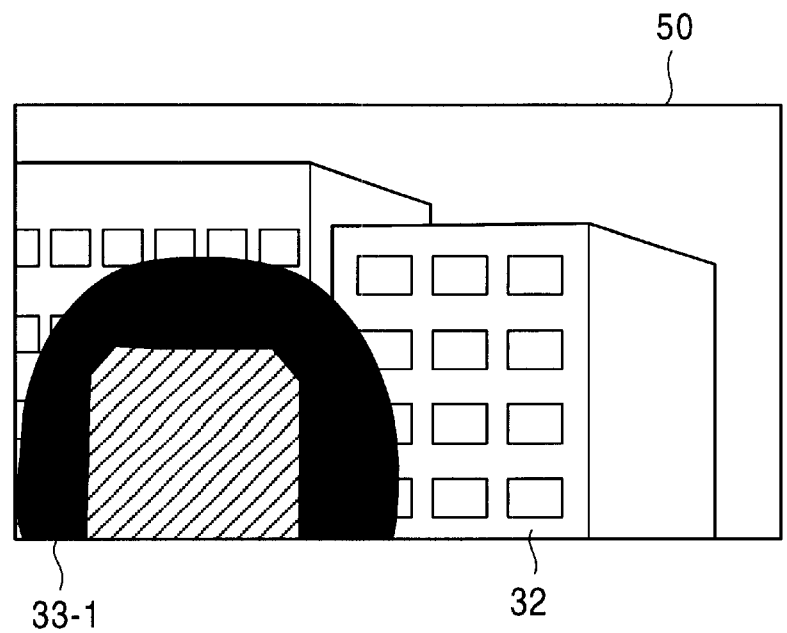
FIG. 8 illustrates an image produced by removing a face part of the image from the image of the first person, photographed on the street, to be connected according to the image connecting method of the invention.
Figure 9:
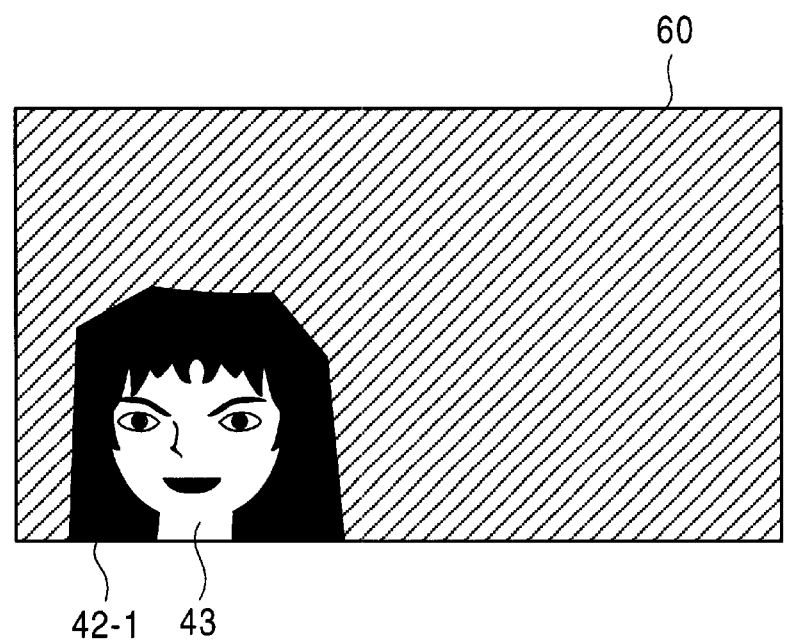
FIG. 9 illustrates an image produced by removing all parts other than the face from the photographed image of the second person to be connected according to the image connecting method of the invention.

In the case where the first image of the person 31 is replaced with the second image of the person 41, the face image 34 of the first image of the person 31 is first removed from the photographed image 30. FIG. 8 shows the resultant image 50 consisting of the background 32 and an outer part 33-1 of the hair image 33 of the first image of the person 31. At the same time, an outer part of the hair image 43 is removed from the second image of the person 41 so as to obtain a resultant image 60 including, as shown in FIG. 9, the face image 43 and the remaining inner part of the hair image 42-1. In FIGS. 8 and 9, the removed parts are denoted by diagonally shaded areas. The part to be removed is designated, for example, by a user. In the above removal process, the designation of the part to be removed is performed such that there is an overlapping area between the outer part 33-1 of the hair image of the remaining photographed image 50 and the inner part 42-1 of the hair image of the remaining photographed image 60.

The remaining photographed image 50 shown in FIG. 8 and the remaining photographed image 60 shown in FIG. 9 are connected to each other in the overlapping area using the image connecting method according to the embodiment of the invention.

In the above process, the partly-removed image 50 shown in FIG. 8 is employed as the first image 1, the partly-removed image 60 shown in FIG. 9 is employed as the second image, the overlapping area between the remaining part shown in FIG. 8 and the remaining part shown in FIG. 9 is employed as a connecting area, and the connection is performed according to the image connecting method described above.

Figure 10:
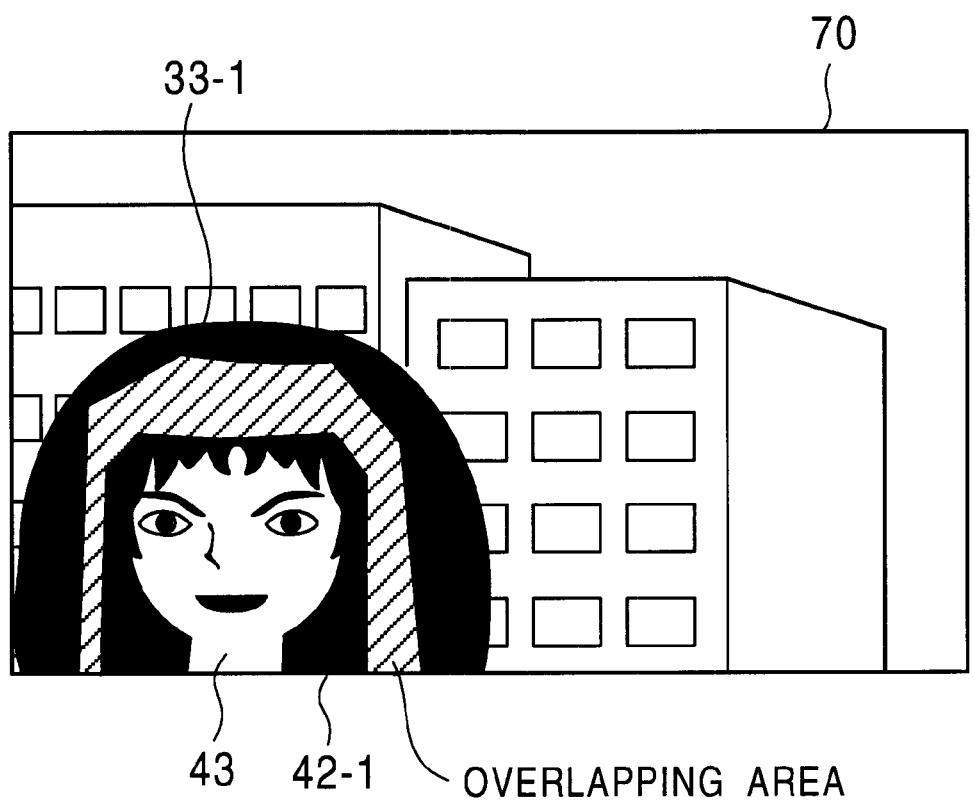
FIG. 10 illustrates an image produced by combining the image of the face of the second person with the image of the first person photographed on the street.

FIG. 10 shows a resultant image 70 obtained by combining the photographed image 30 of the first person on the street and the photographed image 40 of the second person.

In the image connecting method according to the present invention, as described above, the connecting image generation process is performed as the first process such that the first image 1 and the second image 2 are decomposed into frequency components and then the images are connected for each frequency component. This may be accomplished according to the method disclosed in the above-described paper by Peter J. Burt or according to the method described above with reference to FIGS. 2 and 3A and 3B.

In the subsequent second process, the overwrite process is performed on the third image 3 produced in the first process. In this overwrite process, for example, a conspicuous hair is designated by the operator, and the designated hair is overwritten on the third image 3. Thus, a fourth image 4 is finally obtained.

In the above-described image connecting method according to the present embodiment, a conspicuous hair for example is overwritten so as to obtain a natural image. That is, in the overwrite process, the image of the conspicuous hair is combined with the third image 3. In this process, the data representing the conspicuous hair in the first image 1 or the second image is completely overwritten on the third image 3 and the original data corresponding to the conscious hair in the original third image 3 is discarded. The data of the other parts in the third image 3 remains unchanged. In this overwrite process, there is a possibility that the boundary between the overwritten part and the other parts becomes conspicuous and thus the overwritten hair becomes particularly conspicuous. That is, there is a possibility that the overwritten part does not match the third image 3. The poor matching between the overwritten part and the third image 3 can be improved to obtain a more natural image, by improving the second process as follows.

Figure 11:
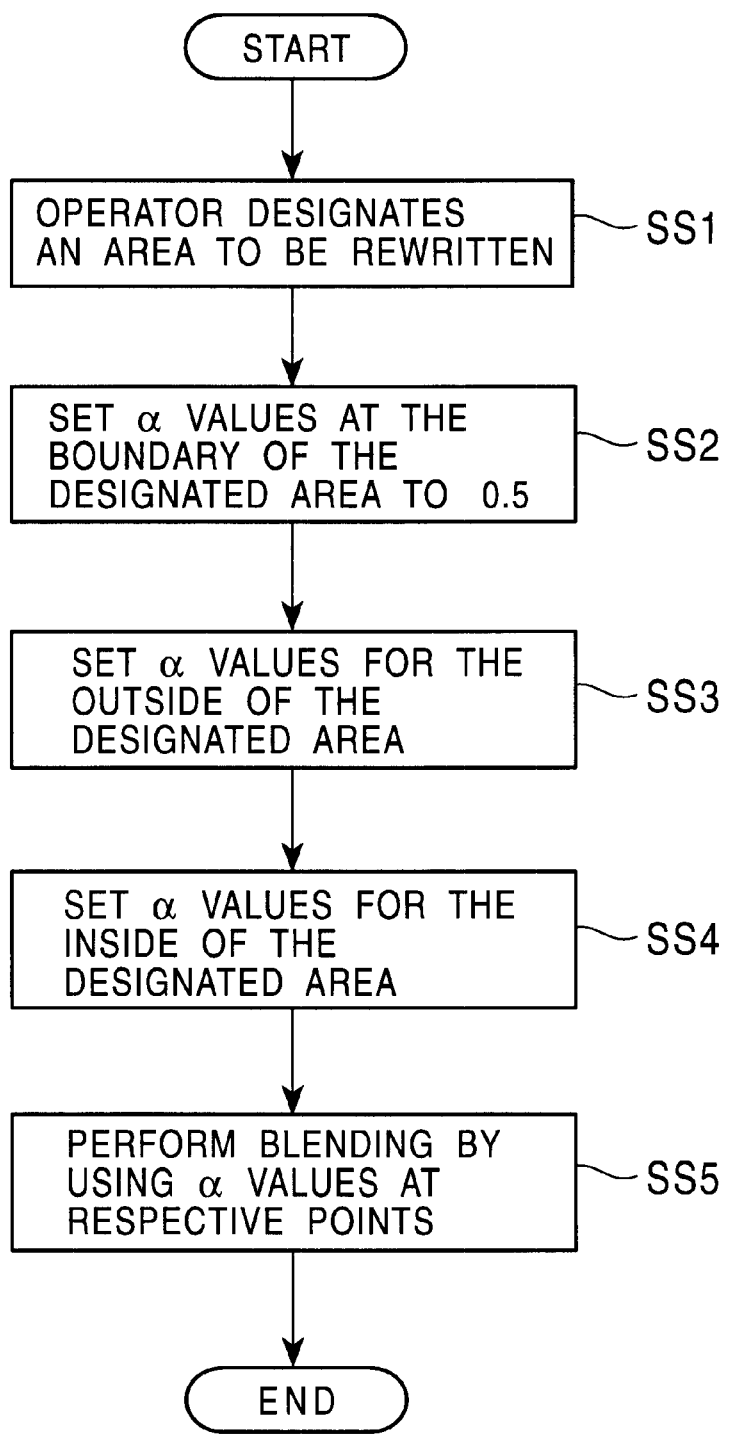
FIG. 11 is a flowchart illustrating an overwrite process in the image connecting process according to the image connecting method of the invention.

That is, in step S5 shown in FIG. 5, the overwrite process is performed in the manner as described in the flowchart of FIG. 11.

Figure 12:
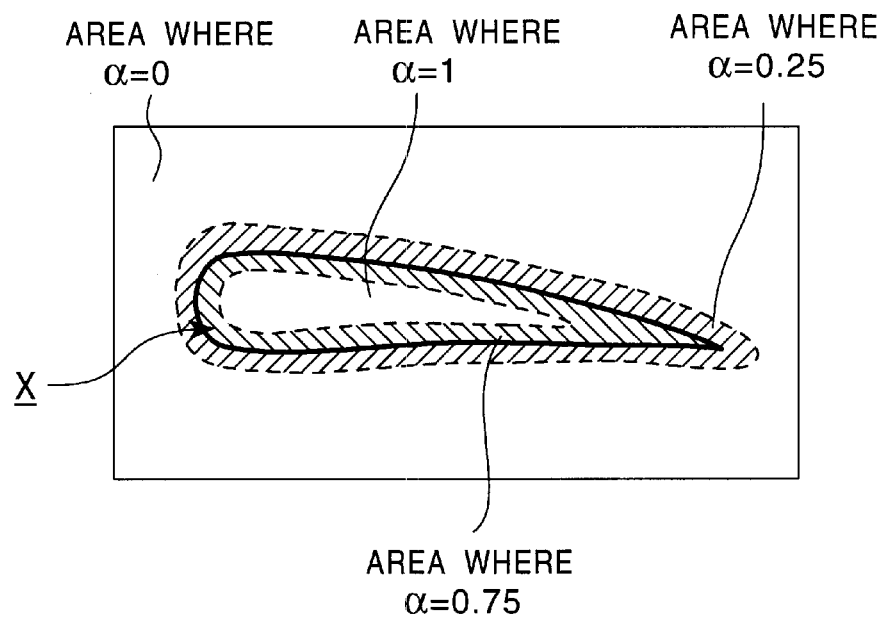
FIG. 12 illustrates an image associated with the overwrite process.
Figure 13:
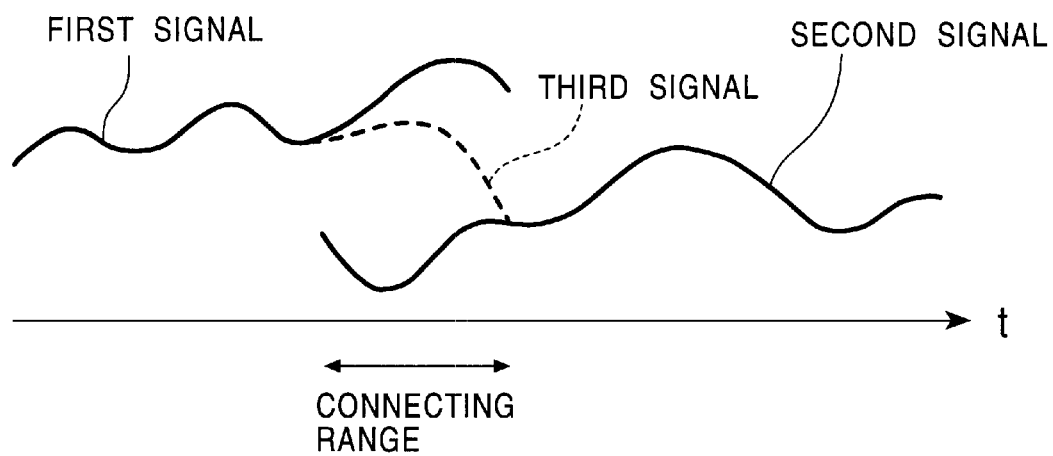
FIG. 13 illustrates first and second signals to be connected according to a conventional signal connecting method and also illustrates a third signal via which the first and second signals are connected.
Figure 15A:
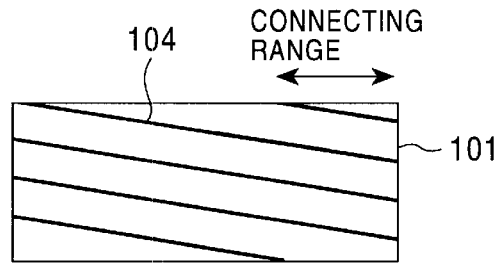
FIGS. 15A, 15B, and 15C illustrate an image which is produced according to the conventional signal connecting method but which includes an unnatural part.
Figure 15B:
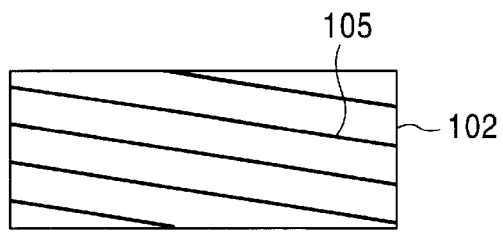
Figure 15C:
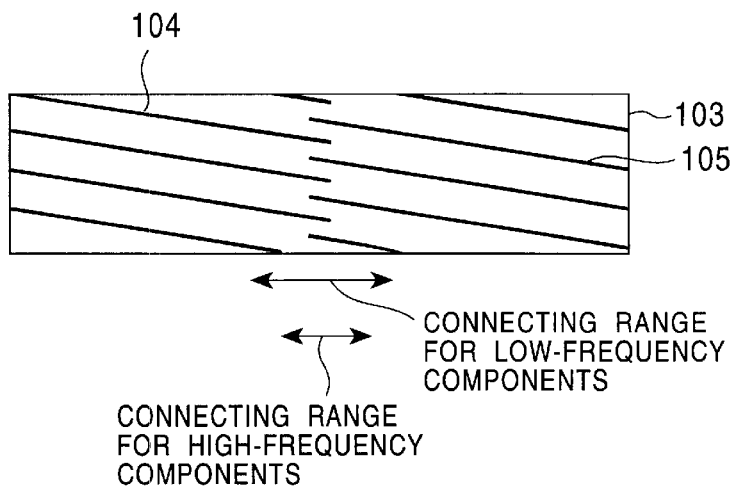

In the overwrite process shown in the flowchart of FIG. 11, at first step SS1, as in the overwrite process described earlier, the operator designates a particular part to be overwritten while monitoring the image displayed. For example, the operator designates a conspicuous hair X in the displayed first image 1 as shown in FIG. 12. In FIG. 12, to provide an easier understanding, one hair X is drawn in an enlarged fashion. Although only one hair is designated herein for simplicity of illustration, the process described herein may also be employed when a plurality of hairs are designated.

In the next step SS2, $\alpha$ values for the edge of the hair designated in step SS1 are set to 0.5.

In the following step SS3, $\alpha$ values for those points which are located outside the hair X and which are one pixel apart from the edge of the hair x are set to 0.25 and $\alpha$ values for points farther apart are set to 0.

Furthermore, in step SS4, $\alpha$ values for those points which are located inside the hair X and which are one pixel apart from the edge of the hair X are set to 0.75 and $\alpha$ values for points farther apart are set to 1.

In steps SS2 to SS4 described above, $\alpha$ values for the hair X designated in step SS1, that is the part to be overwritten, are set depending on the points in the image, as shown in FIG. 12.

In step SS5, for each point of the image, the following value is calculated: [(data at that point of the first image 1)×$\alpha$]+[(data at that point of the third image 3)×(1×$\alpha$). The calculation result is employed as the data at that point for the fourth image 4.

Thus, the improved overwrite process is performed.

In the overwrite process in step S5 shown in FIG. 5, some part of the third image is completely overwritten while the other parts of the third image are not overwritten at all.

In contrast, in the overwrite process shown in the flowchart of FIG. 11, the data, in the fourth image 4, at pixels along the edge of the hair X designated by the user as the part to be overwritten is determined by calculating the weighted sum of the data at the corresponding pixels of the third image 3 and the data at the corresponding pixels of the first image 2 wherein a is employed as the weighting factor. That is, the third image 3 and the first image 1 are combined by means of a soft key. In this case, the third image 3 is connected to the first image via the gradually varying boundary part so that the boundary part becomes inconspicuous. Thus, the resultant fourth image 4 obtained via the above overwrite process has a smooth boundary between the overwritten part and the other part and includes no unnatural part.

Although in the above description, the conspicuous hair in the first image 1 is dealt with, a conspicuous hair in the second image 2 may also be processed in a similar manner.

Furthermore, in the above description, the transition area in which a has a value between 0 and 1 is defined as such an area one pixel apart from the boundary. Alternatively, the transition area may also be defined as an area a greater number of pixels apart from the boundary. The number of pixels which define the transition area may be designated by the operator during the process. This makes it possible to produce a fourth image 4 in more natural fashion, which is obtained as a result of the overwrite process.

Although in the above description, the image of hair is dealt with, the present invention may also be applied to any other image. In particular, the present invention is useful to connect photographed images including a large number of parts having extremely different aspect ratios.

As described above, the present invention has various advantages. That is, in the image connecting method, the image connecting apparatus, and the storage medium on which the image connecting program is stored, according to the present invention, a particular partial image is extracted from the first or second image and the extracted partial image is overwritten on the image produced by connecting the first and second images to each other.

Even when an object having a conspicuous edge is included in the two images connected to each other, the two images can be connected into a single image in a natural fashion without producing an unnatural part such as a conspicuous object which disappears near the center of the connecting area.

What is claimed is:

1. A method of connecting first and second images to each other, said method comprising:

a connection step in which particular connecting areas are determined for said first image and said second image and then said first and second images in said connecting areas are combined together to form a third image thereby connecting said first and second images to each other;

a selection step for selecting a partial image of said first image; and an overwrite step for extracting said selected partial image from said first image and overwriting the extracted partial image on a connecting part of said third image produced in said connection step.

2. An image connecting method according to claim 1, wherein said connection step comprises:

a decomposition step for decomposing said first image and said second image into frequency components; and a composition step in which the connecting area is determined for each frequency such that said connecting area becomes narrower with the increase in the frequency of each frequency component obtained in said decomposition step for said first image and that of said second image, and said first and second images are combined in said connecting area for each frequency component, and finally the resultant images obtained at respective frequencies are all added together thereby combining said first and second images to each other.

3. An image connecting method according to claim 2, wherein said connection step combines said first image and said second images in such a manner that the image signal of said first image and the image signal of said second image are connected via a signal which is determined in said connecting area at each frequency such that the amplitude of said signal is equal to the amplitude of the image signal of said first image at the boundary between said first image and said connecting area and equal to the amplitude of the image signal of said second image at the boundary between said second image and said connecting area and such that the amplitude of said signal increases or decreases over the connecting area from the boundary of said first image to the boundary of the second image.

4. An image connecting method according to claim 1, wherein said selection step and said overwrite step perform selection and overwriting processes also on said second image.

5. An image connecting method according to claim 1, wherein said partial image is an image having a large aspect ratio.

6. An image connecting method according to claim 1, wherein said overwrite step overwrites said partial image on the connecting part of said third image produced in said connection step in such a manner that the weighted sum of the value of said partial image and the value of said connecting part is employed as the value of the resultant image for a part near the edge of said partial image.

7. An image connecting method according to claim 1, further comprising:
   a frequency component detection step for detecting frequency components of said first image and said second image; and
   a high frequency removal step in which lower one of the upper frequency limits of said first and second images is employed as a cutoff frequency and frequency components with frequencies higher than said cutoff frequency are removed from said first image or said second image, or from said third image.

8. An image connecting apparatus for connecting a first image and a second image to each other, said apparatus comprising:
   connection means by which particular connecting areas are determined for said first image and said second image and then said first and second images in said connecting areas are combined together to form a third image thereby connecting said first and second images to each other;
   selection means for selecting a partial image of said first image; and
   overwrite means for extracting said selected partial image from said first image and overwriting the extracted partial image on the connecting part of said third image produced by said connection means.

9. An image connecting apparatus according to claim 8, wherein said connection means comprises:
   decomposition means for decomposing said first image and said second image into frequency components; and
   composition means by which the connecting area is determined for each frequency such that said connecting area becomes narrower with the increase in the frequency of each frequency component obtained by said decomposition means for said first image and that of said second image, and said first and second images are combined in said connecting area for each frequency component, and finally the resultant images obtained at respective frequencies are all added together thereby combining said first and second images to each other.

10. An image connecting apparatus according to claim 9, said connection means combines said first image and said second images in such a manner that the image signal of said first image and the image signal of said second image are connected via a signal which is determined in said connecting area at each frequency such that the amplitude of said signal is equal to the amplitude of the image signal of said first image at the boundary between said first image and said connecting area and equal to the amplitude of the image signal of said second image at the boundary between said second image and said connecting area and such that the amplitude of said signal increases or decreases over the connecting area from the boundary of said first image to the boundary of the second image.

11. An image connecting apparatus according to claim 8, wherein said selection means and said overwrite means perform selection and overwriting processes also on said second image.

12. An image connecting apparatus according to claim 8, wherein said partial image is an image having a large aspect ratio.

13. An image connecting apparatus according to claim 8, wherein said overwriting means overwrites said partial image on the connecting part of said third image produced by said connection means in such a manner that the weighted sum of the value of said partial image and the value of said connecting part is employed as the value of the resultant image for a part near the edge of said partial image.

14. An image connecting apparatus according to claim 8, further comprising:
   frequency component detection means for detecting frequency components of said first image and said second image; and
   high frequency removal means by which lower one of the upper frequency limits of said first and second images is employed as a cutoff frequency and frequency components with frequencies higher than said cutoff frequency are removed from said first image or said second image, or from said third image.

15. An information providing medium for providing an image connecting program for connecting a first image and a second image to each other, said image connecting program comprising:
   a connection process in which particular connecting areas are determined for said first image and said second image and then said first and second images in said connecting areas are combined together to form a third image thereby connecting said first and second images to each other;
   a selection process for selecting a partial image of said first image; and
   an overwrite process for extracting said selected partial image from said first image and overwriting the extracted partial image on the connecting part of said third image produced in said connection process.

16. An information providing medium according to claim 15, wherein said connection process in said image connecting program comprises:
   a decomposition process for decomposing said first image and said second image into frequency components; and
   a composition process in which the connecting area is determined for each frequency such that said connecting area becomes narrower with the increase in the frequency of each frequency component obtained in said decomposition process for said first image and that of said second image, and said first and second images are combined in said connecting area for each frequency component, and finally the resultant images obtained at respective frequencies are all added together thereby combining said first and second images to each other.

17. An information providing medium according to claim 16, wherein said connection process in said image connecting program combines said first image and said second images in such a manner that the image signal of said first image and the image signal of said second image are connected via a signal which is determined in said connecting area at each frequency such that the amplitude of said signal is equal to the amplitude of the image signal of said first image at the boundary between said first image and said connecting area and equal to the amplitude of the image signal of said second image at the boundary between said second image and said connecting area and such that the amplitude of said signal increases or decreases over the connecting area from the boundary of said first image to the boundary of the second image.

18. An information providing medium according to claim 15, wherein said selection process and said overwrite process in said image connecting program perform the selection and the overwrite also on said second image.

19. An information providing medium according to claim 15, wherein said partial image is an image having a large aspect ratio.

20. An information providing medium according to claim 15, wherein said overwrite process in said image connecting program overwrites said partial image on the connecting part of said third image produced in said connection process in such a manner that the weighted sum of the value of said partial image and the value of said connecting part if employed as the value of the resultant image for a part near the edge of said partial image.

21. An information providing medium according to claim 15, wherein said image connecting program further comprises:

a frequency component detection process for detecting frequency components of said first image and second image; and a high frequency removal process in which lower one of the upper frequency limits of said first and second images is employed as a cutoff frequency and frequency components with frequencies higher than said cutoff frequency are removed from said first image or said second image, or from said third image.

* * * * *